(12) United States Patent
Snyder (10) Patent No.: US 12,245,600 B2
(45) Date of Patent: Mar. 11, 2025

(54) FISH STUNNING DEVICE MOUNTABLE TO A FISHING LINE (71) Applicant: Elizabeth Ann Snyder, Apopka, FL (US)

(72) Inventor: Elizabeth Ann Snyder, Apopka, FL (US)

( * ) Notice: Subject to any disclaimer, the term of this patent is extended or adjusted under 35 U.S.C. 154(b) by 31 days.

(21) Appl. No.: 18/234,309

(22) Filed: Aug. 15, 2023

(65) Prior Publication Data

US 2024/0057622 A1     Feb. 22, 2024

Related U.S. Application Data

(60) Provisional application No. 63/398,930, filed on Aug. 18, 2022.

(51) Int. Cl.
*A22B 3/00* (2006.01)
*A22B 3/08* (2006.01)

(52) U.S. Cl.
CPC .................... *A22B 3/083* (2013.01)

(58) Field of Classification Search
CPC ............ A22B 3/083; A22B 3/086; A22B 3/06
USPC .......................................... 452/57
See application file for complete search history.

(56) References Cited

U.S. PATENT DOCUMENTS

| 2,818,672 | A  | * | 1/1958 | Kreutzer | ............... | A01M 1/223 |
| | | | | | | 43/17.1 |
| 2006/0168872 | A1 | * | 8/2006 | Locklear | ............... | A01K 79/02 |
| | | | | | | 43/17.1 |

* cited by examiner

*Primary Examiner* — Richard T Price, Jr.
(74) *Attorney, Agent, or Firm* — Jason T. Daniel, Esq.; Daniel Law Offices, P.A.

(57) ABSTRACT

A fish stunning device includes a submersible main body with a watertight interior that houses an electronic suite. The main body is securable onto a fishing line and includes internal weights for traveling underwater along the length of the line. A plurality of resilient malleable protrusions each having an electrode extend outward from the main body. Each of the electrodes is connected to the electronic suite and function to impart an electrical shock onto a fish that is engaged with a hook on the end of the fishing line. The electronic suite has a power source for receiving and storing an electrical charge and a power output unit for amplifying and discharging the electrical charge to the electrodes. A system controller communicates with a pressure switch and a user interface to selectively activate the electrodes underwater.

10 Claims, 7 Drawing Sheets

FISH STUNNING DEVICE MOUNTABLE TO A FISHING LINE

CROSS-REFERENCE TO RELATED APPLICATIONS

This application claims the benefit of U.S. Application Ser. No. 63/398,930 filed on Aug. 18, 2022, the contents of which are incorporated herein by reference.

TECHNICAL FIELD

The present invention relates generally to fishing devices, and more particularly to a fish-stunning device that is mountable to a fishing line and configured to apply an electrical current onto a fish that is hooked on the fishing line.

BACKGROUND

The statements in this section merely provide background information related to the present disclosure and may not constitute prior art.

Fishing is the sport of catching fish, and typically requires the use of a fishing rod, a fishing reel, line, and hook. In many applications, the hook is baited with organic material and/or a fishing lure is provided at or near the hook in order to attract a fish. Eventually, the fish may bite the hook and pull on the line, at which point the fisherman will begin to reel the line in to catch the fish.

During the reel-in process, and especially depending on the size of the fish, the fisherman may need to struggle against the fish fighting back and pulling on the line. For instance, in the event of catching a relatively large fish such as a tuna, the user may often need to struggle with the fish for up to 30 minutes before being able to reel in the line and pull the fish onto the dock or boat. On some occasions, even after carrying out such long and intense efforts to reel in the fish, the fisherman may decide not to keep the fish and instead return the live fish back into the water body.

Unfortunately, during this struggle, it is not uncommon for nearby sharks to be attracted by the struggling fish and to attack the fish while it is still on the line, thus causing the entire effort to be a fruitless endeavor. Moreover, even when the fisherman is able to retrieve the fish, the violent thrashing performed by the fish during the reel-in process produces high amounts of lactic acid which adversely impacts the flavor of the meat of the fish and may cause the captured fish to not be satisfactory for human consumption.

Accordingly, it would be beneficial to provide a fish stunning device which can be mountable onto a fishing line in order to momentarily stun a fish to reduce the time required to reel in a fish, thereby overcoming the above noted deficiencies.

SUMMARY OF THE INVENTION

The present invention is directed to a fish stunning device. One embodiment of the present invention can include a submersible main body with a watertight interior for housing an electronic suite. The main body is securable onto a fishing line and capable of traveling underwater along the length of the line. A plurality of resilient malleable protrusions can extend outward from the main body. Each of the protrusions includes an electrode along a distal end. Each of the electrodes can be connected to the electronic suite and configured to impart an electrical shock onto a fish that is engaged with a hook on the end of the fishing line.

In one embodiment, the electronic suite can include a power source for receiving and storing an electrical charge, and a power output unit for amplifying and discharging the electrical charge to the electrodes. A system controller can control the device operations and a user interface communicates with a device user. In one embodiment, a pressure switch is located along the main body and provides pressure information to the controller to selectively activate the electrodes.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably positioned," and derivatives thereof shall be used to describe a situation wherein two or more objects are joined together in a non-permanent manner so as to allow the same objects to be repeatedly joined and separated.

As described herein, the term "resilient" and "resilient memory" are used interchangeably to define the ability of a component to maintain a particular shape and to attempt to return to the particular shape after being bent, folded, twisted or otherwise manipulated.

FIGS. 1-7 illustrate one embodiment of a fish stunning device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, one embodiment of a fish stunning device can include a main body having a plurality of electrically charged electrodes which extend outward therefrom. The main body is connected to a fishing line, and travels through the water to make contact with and deliver an electric shock to a fish that is engaged by a hook on the end of the fishing line. The electrical shock is suitable to stun the fish to enable the fisherman to quickly reel the fish without causing the fish to struggle. Because the shock is temporary, the fish may be released back into the water without injury.

As shown in the drawings, the device 10 can include a main body 11 having a top end 11a, a bottom end 11b, and a sidewall 11c. The main body can preferably be constructed from plastic or other non-electrically conductive materials that are suitable for prolonged exposure to fresh and salt water without corroding. In the preferred embodiment, the main body can include one or more weighted elements 12 such as lead weights or other dense materials along the bottom portion and will include the illustrated ovoid shape to permit the main body to rapidly sink through a body of water as it travels along a fishing line in the manner described below. Of course, any number of other shapes and materials are also contemplated.

In one embodiment, a through bore can extend the length of the main body from the top end 11a to the bottom end 11b, and an elongated hollow tube 20 can be positioned within the bore. In the preferred embodiment, the tube will also be constructed from a non-corrosive and electrically nonconductive material such as plastic or rubber, for example, and the tube can include a top end 21a, a bottom end 21b and a continuous sidewall 21c.

In one embodiment, a first slit 15 can be positioned along the length of the main body so as to extend from the top end 11a to the bottom end 11b. The first slit penetrates through the main body so as to allow access to the elongated tube 20 via the slit 15. Likewise, a second slit 25 can be positioned along the length of the elongated tube so as to extend from the top end 21a to the bottom end 21b. Each of the slits 15 and 25 can preferably include complementary shapes and sizes to each other.

Figure 1:
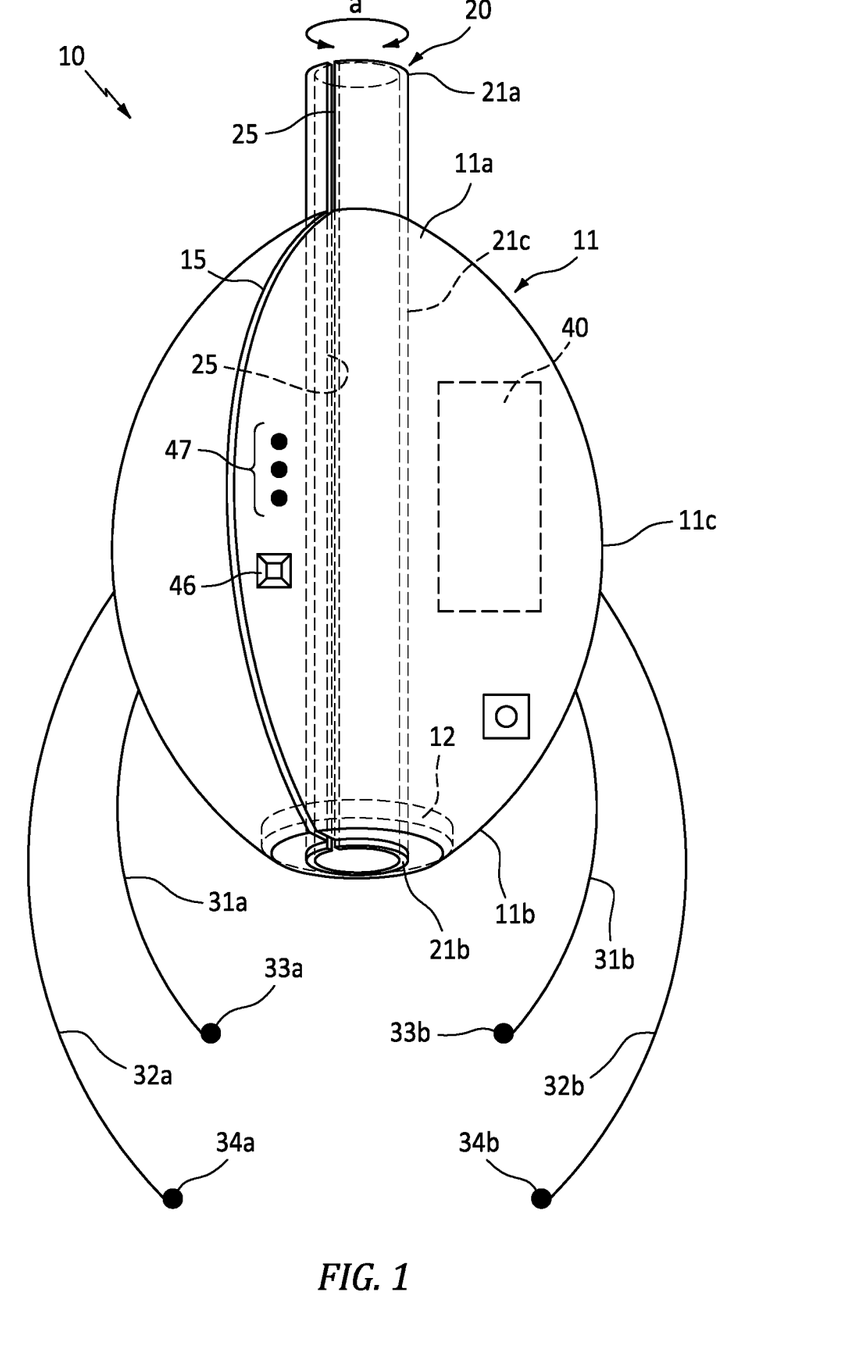
FIG. 1 is a perspective view of a fish stunning device that is useful for understanding the inventive concepts disclosed herein.
Figure 2:
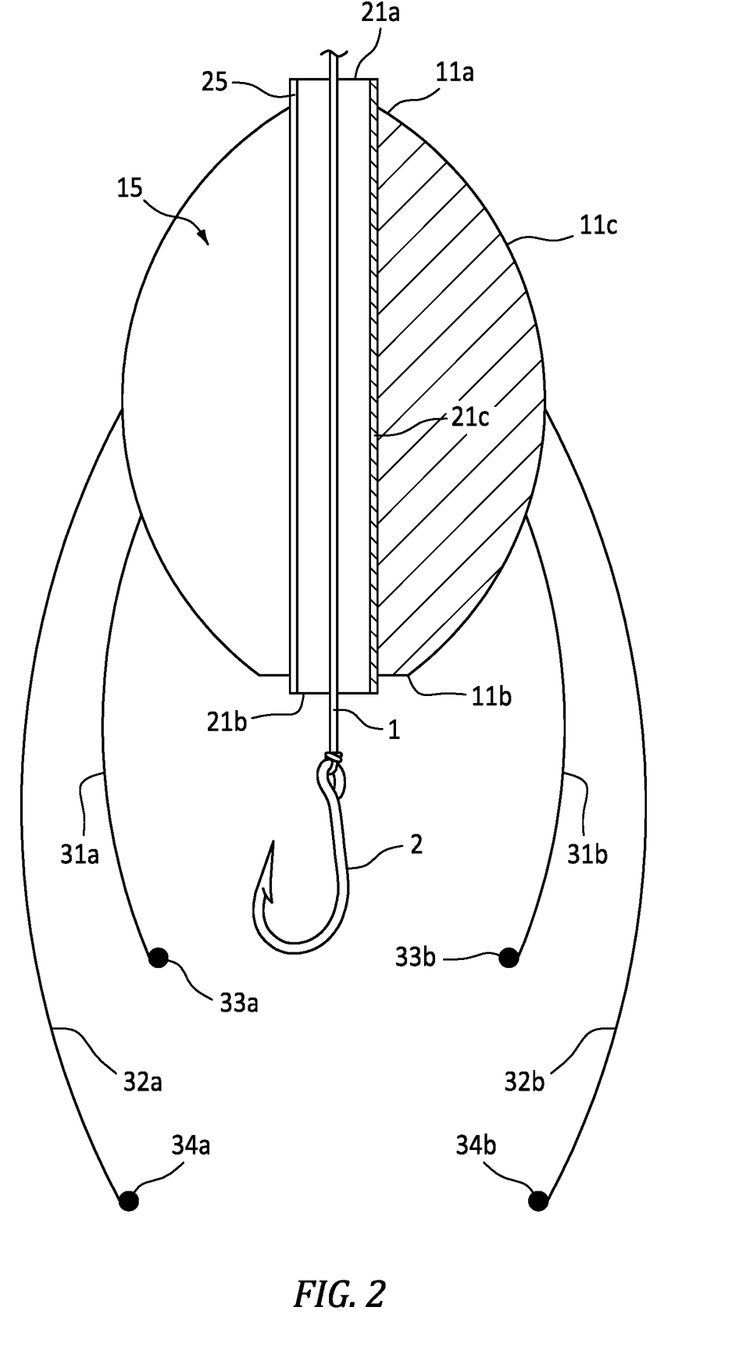
FIG. 2 is a side cross sectional view of the fish stunning device of FIG. 1, in accordance with one embodiment of the invention.
Figure 3:
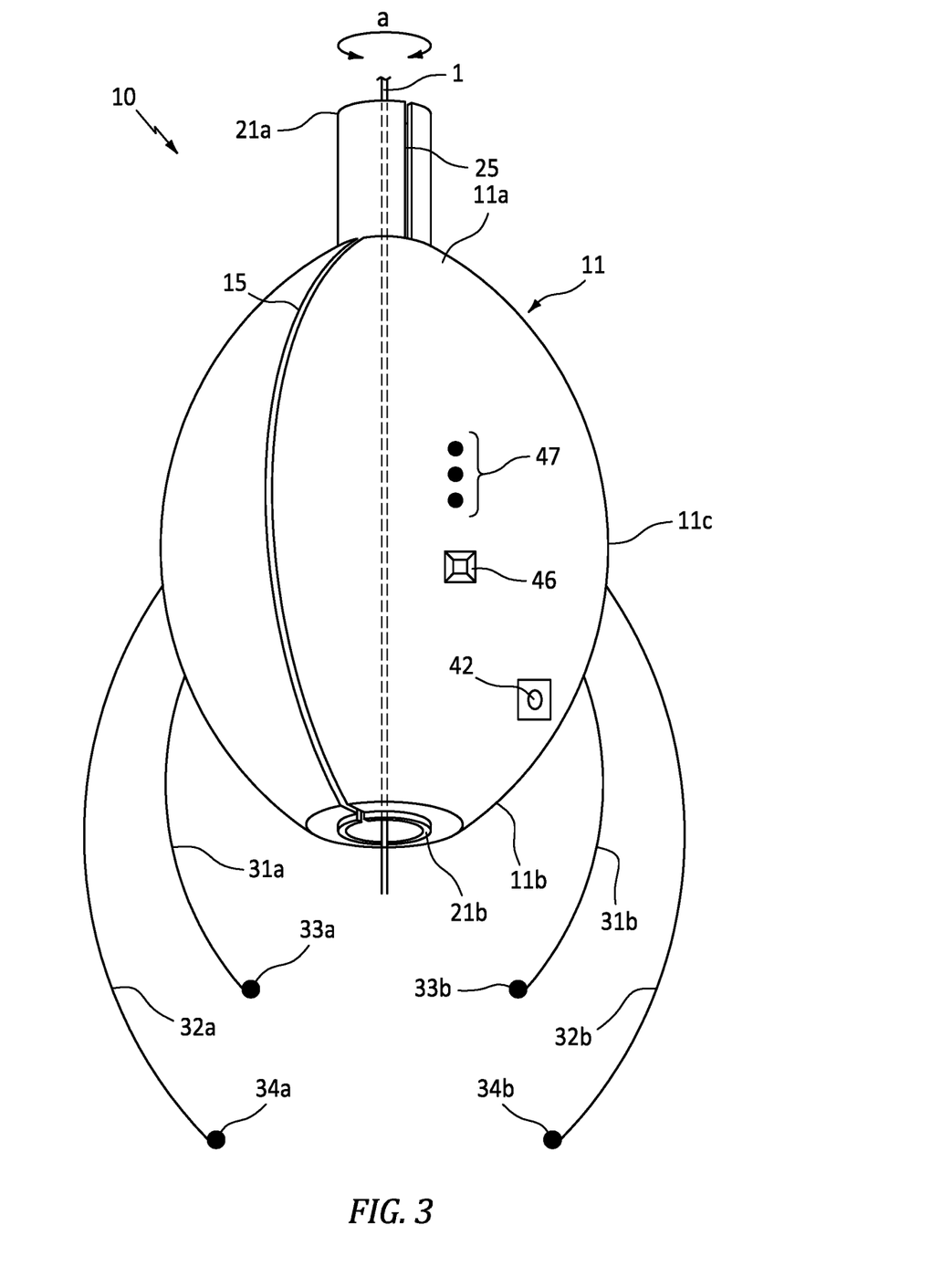
FIG. 3 is a perspective view of the fish stunning device in the closed position, in accordance with one embodiment of the invention.

In the preferred embodiment, the tube 20 can be positioned within the main body in a manner that permits the tube to rotate about its central longitudinal axis (e.g., rotatably positioned). In this regard, the tube can be rotated (see arrow a) so as to selectively position the tube in an open position as shown at FIGS. 1 and 2, and a closed/locked position shown at FIG. 3. In the open position, the slits 15 and 25 will be aligned so as to allow a fishing line 1 having a fishing hook 2 along a distal end to be positioned through the main body 11 and into the hollow middle section of the tube 20. When so positioned, the tube can be rotated back to the locked position whereby the slits are not aligned, and the fishing line will remain within the tube. Such a feature advantageously allows the device to be secured onto a fishing line without requiring the distal end of the line to be fed through the device.

In the preferred embodiment, the tube will be biased to the closed position via an internal spring or other such component so as to ensure the device reverts to or remains in the closed position unless acted upon by a user. Of course, other embodiments for securing the device onto a fishing line and to permit movement of the device along the line are also contemplated.

In one embodiment, a plurality of elongated resilient protrusions 31a, 31b, 32a and 32b can extend outward from the main body of the device. Each of the protrusions can be constructed from an elongated piece of malleable, non-corrosive, and non-electrically conductive material such as rubber or plastic tubing for example. In the preferred embodiment, protrusions 31a and 31b can include identical lengths to each other, and protrusions 32a and 32b can also include identical lengths to each other. In this regard, protrusions 32a and 32b can be longer than protrusions 31a and 31b, so as to extend further beneath the main body. Of course, other embodiments are contemplated wherein a greater or lesser number of protrusions are provided, and wherein the lengths of the protrusions differ from that described above.

In one embodiment, the device can include functionality for delivering an AC voltage across a plurality of electrodes to selectively incapacitate a fish that is engaged by the fishing hook 2 connected to the fishing line 1. In this regard, a first pair of electrodes 33a and 33b can be provided along the distal ends of protrusions 31a and 31b, respectively. Likewise, a second pair of electrodes 34a and 34b can be provided along the distal ends of protrusions 32a and 32b, respectively. Each of the electrodes can be electrically connected to the below described electronic suite 30 such that a voltage provided to one or both electrodes 33a relative to electrode 33b and/or electrode 34a relative to electrode 34b, is sufficient to stun and incapacitate a fish.

Figure 4:
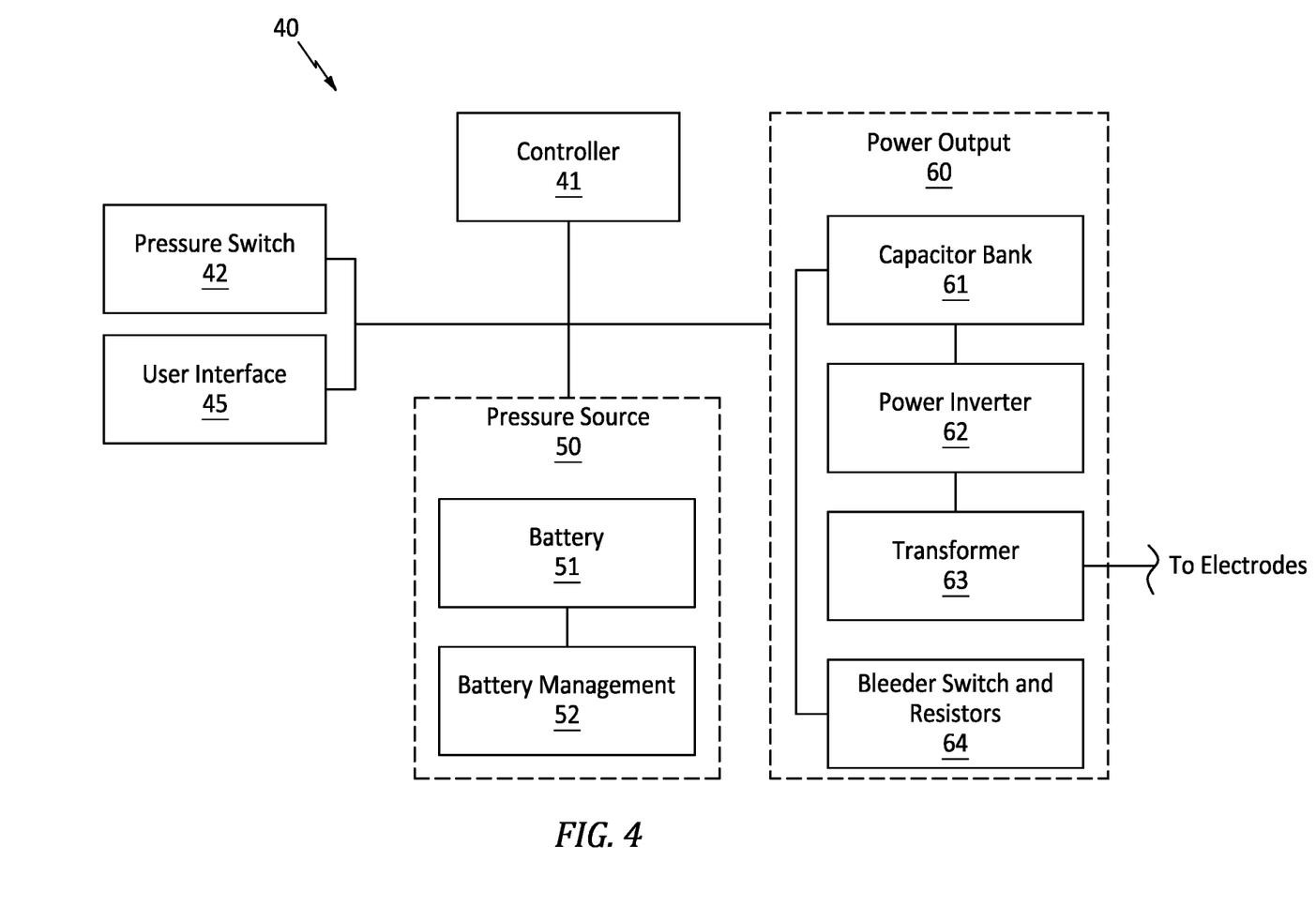
FIG. 4 a simplified block diagram of the electronic suite of the fish stunning device, in accordance with one embodiment of the invention.

FIG. 4 illustrates one embodiment of the electronic suite 40 of the device 10. As shown, the suite can include a controller 41 that is in electrical communication with a pressure switch 42, a user interface 45, a power source 50, and a power output unit 60. Various components of the electronic suite can be provided as a single unit along a printed circuit board sealed in a watertight manner within the main body, for example, and/or may be connected together in accordance with known methodologies using any number of discrete components and communication devices such as various communication and power cables, system bus, pic controllers and the like, in order to achieve the functionality described herein.

The system controller 41 can function to control the operation of the components within the electronic suite so as to control the process for selectively discharging an AC voltage across two electrodes in the protrusions of the device. In one embodiment, the controller 41 can include, comprise, or consist of one or more printed circuit boards (PCB) containing any number of integrated circuits to complete the activities described herein. To this end, the controller can include one or more processors and/or central processing units that are conventionally connected to one or more memory components for storing operating instructions in the form of program code for the processor(s) to execute.

In one embodiment, a water pressure sensor 42 can be positioned along or within the main body 11. The water pressure sensor can function to detect the pressure of the water being asserted onto the main body, and thus determine the depth at which the main body is located. As will be described below, information from the water pressure sensor can be used by the controller to selectively arm or disarm the electrodes such that the device will only discharge power through the electrodes when the main body is underwater.

In one embodiment, a user interface 45 can be provided and can function to send and/or receive information such as operating instructions with a device user. In the illustrated embodiment, the user interface 45 can include or can be connected to one or more distinct user input mechanisms such as a waterproof momentary switch 46, for example. Each of the button(s) can function to receive operating instructions from a user such as switching the device between an "on" and "off" operating state, providing a charge to the electrodes, adjusting the voltage to be discharged by the electrodes, bleeding a charge from the electrodes, and/or setting the maximum and minimum depth settings for the water pressure sensor, among others, for example.

In one embodiment, the user interface can also include or be connected to any number of visual display elements 47 such as a plurality of multicolor LED lights, and/or a display screen for example. The display element(s) can function to provide a user with a distinct visual reference regarding the operational status of the device. Several nonlimiting examples of information that can be displayed by the display elements include but is not limited to device on/off status, electrode charge status, voltage status, minimum and maximum depth status for the pressure switch and the like, for example.

The power source 50 can function to receive and store power for use by the device components. In one embodiment, the power source can include a battery pack 51, a battery management unit 52 and a battery charging unit 53.

As described herein, the battery pack 51 can preferably include any number of individual batteries such as lightweight lithium-ion polymer (LiPo) batteries, for example, which may be arranged serially and/or in parallel to produce a desired voltage such as 12v, 18v, 20v and/or 50v, for example. In the preferred embodiment, each of the batteries will be rechargeable in nature, and will be permanently housed within the main body. Such batteries can be recharged in a wireless capacity via an external charger and/or may be recharged via a cable and receptacle such as a USB-C port with a waterproof cover that is positioned along the main body.

Of course, any number of other battery types are also contemplated. Moreover, other embodiments are contemplated wherein the batteries are removable in nature via a removable and watertight battery access panel located along the main body. In such an instance, the batteries can be replaced at any time when needed.

In either instance, the battery management unit 52 can include any number of circuits and/or individual components such as diodes, transistors, relays and resistors, for example that can be electrically connected to the batteries to prevent the same from being overcharged and/or for preventing an over voltage or over current situation between the batteries and the controller or power output unit.

The power output unit 60 can function to receive and selectively discharge power from the power source 50 to the electrodes 33a/33b and 34a/34b. In one embodiment, the unit 60 can include at least one capacitor 61, a power inverter 62, a power transformer 63, and a charge bleeder unit 64.

The capacitor 61 can function to receive and store electrical energy from the battery pack 51. During the charging process, the display element(s) 47 can notify the user that the device is charging and can also notify the user when the capacitor has been fully charged.

Upon receiving a command from the user switch 46 and/or the pressure switch 42, the capacitor can rapidly discharge the received power to the power inverter.

The power inverter 62 can function to receive and convert DC voltage received from the capacitor into AC voltage. The output of the power inverter is immediately fed into the transformer.

The power transformer 63 can comprise a step-up transformer that receives the AC voltage from the inverter, increases the received voltage and discharges the output to the electrodes. In the preferred embodiment, the output of the power transformer to the electrodes can sustain an electric field at a distance of 20 cm from a point centered between the charge-delivery electrodes up to 150 V/m for up to 2 seconds in seawater having a conductivity of 6 S/m. Such amounts being specifically chosen so as to be suitable for stunning and temporarily paralyzing target fish such as market-sized Atlantic salmon for between 5 and 45 seconds but without causing injuries or permanent damage to the fish. Likewise, the target discharge is low enough to ensure the shock would not permanently injure or kill a human in the unforeseen event, the electrodes are discharged onto the human.

Of course, other embodiments are also contemplated wherein a different electrical output can be achieved and discharged by the device, so as to be suitable for use with smaller or larger fish. To this end, one embodiment is contemplated wherein the transformer comprises a variable output transformer having functionality for allowing a user to adjust the electrical output across any pair of electrodes using the user interface device 45. In such an embodiment, a user can increase or decrease the electrical output of all electrodes and/or can selectively increase or decrease the electrical output of only one pair of electrodes 33a/33b or 34a/34b, for example.

The bleeder unit 44 can also be connected to the capacitor 61 and can function to fully dissipate an electric charge in the power output unit. In one embodiment, the bleeder unit can include a switch that can open an electrical pathway from the capacitor bank to a plurality of resistors upon receiving a command from the controller.

In various embodiments, the bleeder unit can be automatically activated by the controller upon determining that the device has been reeled up through the minimum depth setting determined by the pressure switch without discharging the energy in the capacitor bank. Such a feature acts as a built-in safety device for preventing a situation wherein the electrodes are inadvertently discharged, so as to ensure the device remains uncharged and safe between uses. Of course, any number of other components are contemplated for discharging and rendering the system safe.

FIGS. 5-8 illustrate one embodiment of the device 10 in operation. As shown, a user 5, can utilize a fishing rod 6 to catch fish. The fishing rod 6 may include a reel and other related parts as known for instance in the art. A fishing line 1 can extend from the fishing rod 6 into the water W and may be selectively wound onto or unwound from the reel. At a free end, the fishing line 1 carries a hook 2.

Figure 5:
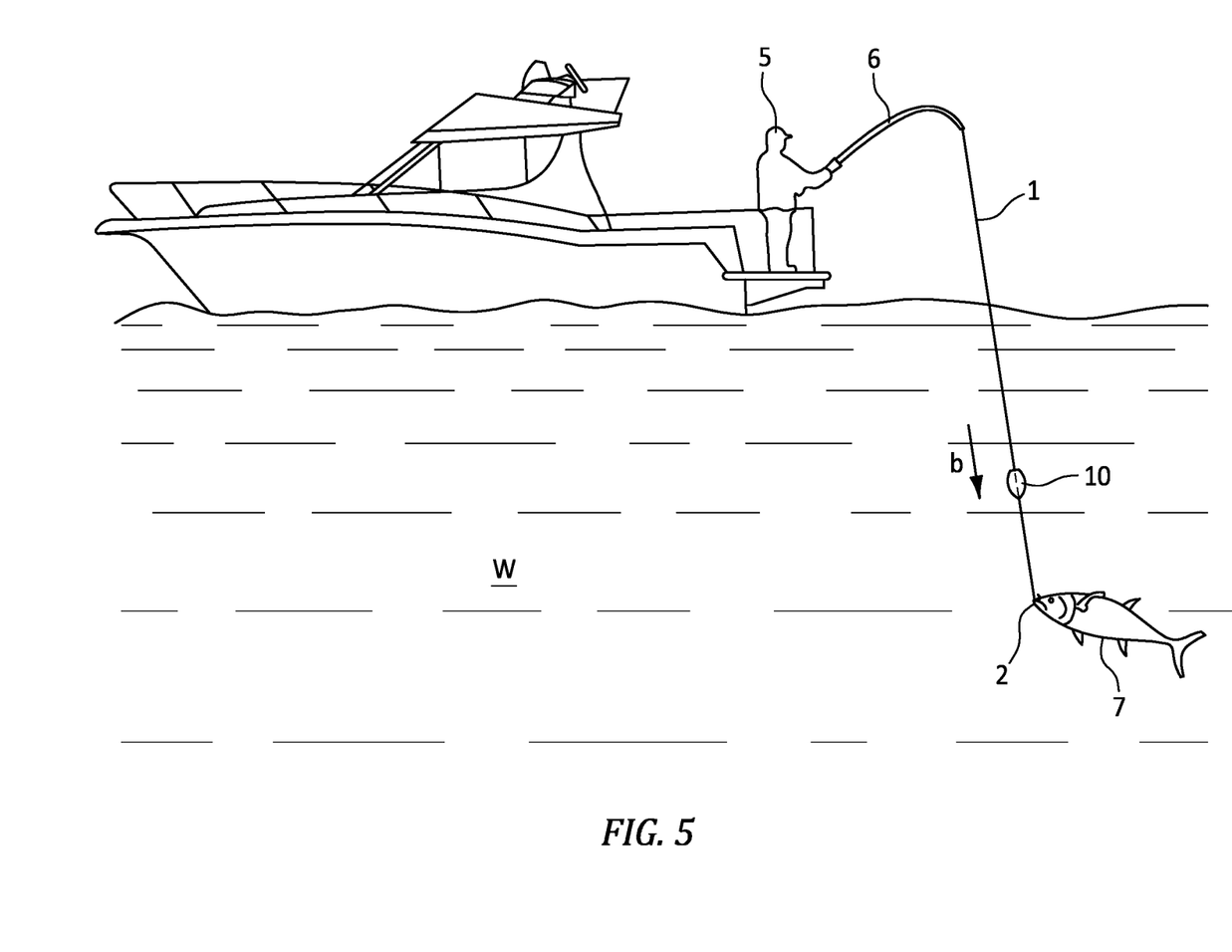
FIG. 5 is a perspective view of the fish stunning device in operation, in accordance with one embodiment of the invention.

Upon determining that a fish 7 has bitten the hook 2, the user 5 may then couple the fish-stunning device 10 onto the fishing line 1 in the manner described above. Next, the user 5 may activate the electronic suite 40 of the device via switch 46, for example, at which time the capacitor can begin to charge. At this time, the display elements 47 can provide a visual indicator to the user 5 that the fish-stunning device 10 is activated and will alert the user when the capacitors are charged and the device is ready for use.

Upon ensuring the main body is slidably coupled to the fishing line 1, and receiving the notification that the device is charged, the user can drop the main body into the water where it will slide (see arrow b) along the length of the fishing line 1 toward the hook 2. Concurrently with this action, the user can begin to reel the line and fish toward the user so as to ensure the line remains taught. As the device 10 sinks beneath the water, the pressure sensor 42 will detect the water pressure is beyond a predetermined threshold such as 5 feet, for example, and will notify the controller which will then activate the electrodes with an electrical charge from the power output unit.

Figure 6:
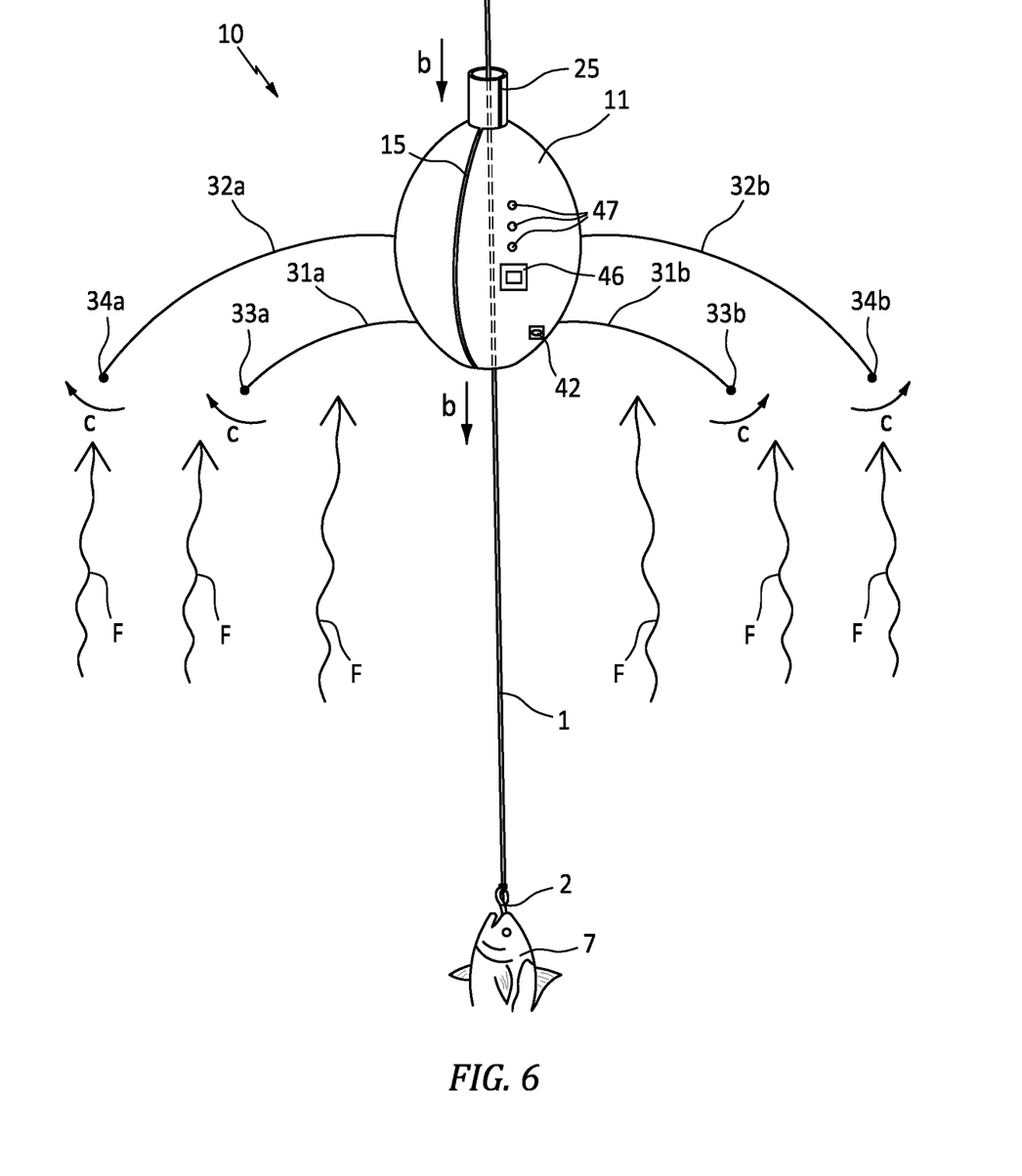
FIG. 6 is another perspective view of the fish stunning device in operation, in accordance with one embodiment of the invention.

As shown at FIG. 6, as the device travels down along the length of the fishing line 1, the force F of the water acting on the malleable protrusions 31a, 31b, 32a and 32b causes these components to remain separated and move away from the bottom end of the device as shown by arrows c. Such a feature ensures the electrodes do not come in contact with each other and ensures separation of the electrodes so they are able to engage the fish along the body, rather than the mouth.

Figure 7:
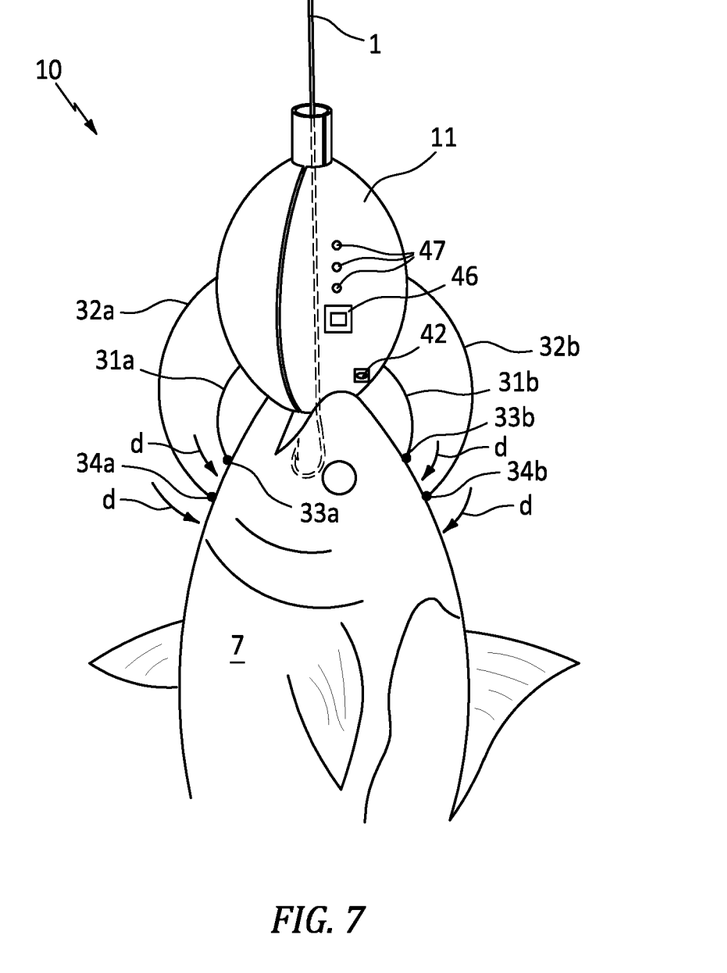
FIG. 7 is yet another perspective view of the fish stunning device in operation, in accordance with one embodiment of the invention.

As shown at FIG. 7, when the bottom end of the main body reaches the hook 2 or the fish 7, the device comes to an abrupt stop at which time the resilient nature of the protrusions 31a, 31b, 32a and 32b, along with the force caused by the sudden stop will cause the protrusions to move downward and toward each other. When this occurs, the electrodes 33a-33b and/or 34a-34b will make contact with the fish and will deliver the electrical charge from the power output unit. Ideally, the electrodes will make contact with on opposite sides of the fish's body so as to ensure the discharge travels across the brain of the fish to quickly stun and immobilize the fish.

Once the fish is immobilized, the user can continue to reel the fish upward without the stress of the fish thrashing and thereby ensuring sharks or other nearby predators are not alerted by the struggling fish. Once the user has retrieved the fish from the water, they can choose to keep the fish, whereby the benefits of the fish not struggling during the retrieval process will not result in the lactic acid buildup and ruining the meat of the fish. Alternatively, if the user chooses to release the fish back into the water, the low intensity and extremely short duration of the shock will not cause injuries to the fish, and it will not be otherwise harmed from the encounter.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fish stunning device, comprising:
   a main body having a top end, a bottom end, and an interior space;
   a plurality of protrusions that extend outward from the main body;
   a plurality of electrodes that are positioned along the plurality of protrusions;
   a power source that is configured to receive and store an electrical charge;
   a user interface that is in communication with the power source; and
   a power output unit that is configured to selectively discharge the electrical charge to the plurality of electrodes,
   wherein the main body includes functionality for slidingly engaging a fishing line.

2. The device of claim 1, wherein the plurality of electrodes is configured to discharge the electrical charge to a fish that is engaged by a hook secured to the fishing line.

3. The device of claim 1, wherein the interior space of the main body is watertight.

4. The device of claim 1, wherein the power source includes a rechargeable battery.

5. The device of claim 1, wherein the power output unit includes a capacitor that is in communication with the power source.

6. The device of claim 5 wherein the capacitor receives power from the power source in response to a user instruction from the user interface.

7. The device of claim 5, wherein the power output unit includes a transformer that is in communication with the capacitor and each of the plurality of electrodes.

8. The device of claim 7, wherein the transformer receives power from the capacitor, amplifies the received power, and discharges amplified power to the plurality of electrodes in response to a user instruction from the user interface.

9. The device of claim 1, wherein the user interface includes at least one waterproof momentary switch.

10. The device of claim 1, wherein the user interface includes at least one visual indication device.

\* \* \* \* \*